United States Patent [19]

Geeraert

[11] Patent Number: 5,330,691
[45] Date of Patent: Jul. 19, 1994

[54] METHOD FOR PRODUCING GLASS FIBER REINFORCED PLASTERBOARD

[75] Inventor: Emmanuel H. C. A. Geeraert, Ekeren, Belgium

[73] Assignee: N.V. Recdo S.A., Kapelle, Belgium

[21] Appl. No.: 941,209

[22] Filed: Sep. 4, 1992

Related U.S. Application Data

[62] Division of Ser. No. 681,108, Apr. 5, 1991, Pat. No. 5,173,364.

[30] Foreign Application Priority Data

Apr. 12, 1990 [DE] Fed. Rep. of Germany ....... 4011793

[51] Int. Cl.$^5$ .................... B28B 1/08; B28B 11/14
[52] U.S. Cl. ........................ 264/42; 264/69; 264/70; 264/118; 264/122; 264/145; 264/160; 264/163
[58] Field of Search ............. 264/70, 42, 118, 122, 264/86, 87, 69, 145, 148, 160, 163, 333

[56] References Cited

U.S. PATENT DOCUMENTS

| | | |
|---|---|---|
| 2,200,155 | 5/1940 | Camp et al. ............... 264/70 X |
| 3,616,173 | 10/1971 | Green ............................. 161/162 |
| 3,764,357 | 10/1973 | Bowles et al. .............. 264/42 X |
| 3,878,278 | 4/1975 | Miller et al. ................ 264/42 X |
| 3,929,947 | 12/1975 | Schwartz et al. ............... 264/42 |
| 3,979,217 | 9/1976 | Sutton ............................. 264/333 |
| 3,993,822 | 11/1976 | Knauf ............................ 428/213 |
| 4,010,232 | 3/1977 | Labrecque ................... 264/46.4 |
| 4,043,825 | 8/1977 | Muller ........................... 106/87 |
| 4,067,939 | 1/1978 | Lowe et al. .................... 264/42 |
| 4,087,285 | 5/1978 | Kurz ........................... 264/122 X |
| 4,127,628 | 11/1978 | Uchida .......................... 264/42 |
| 4,133,928 | 1/1979 | Riley ............................ 428/255 |
| 4,153,470 | 5/1979 | Stahl ............................ 106/116 |
| 4,195,110 | 3/1980 | Dierks .......................... 428/218 |
| 4,240,839 | 12/1980 | Crepeau ......................... 106/88 |
| 4,265,979 | 5/1981 | Baehr ............................ 428/171 |
| 4,328,178 | 5/1982 | Kossatz ......................... 264/69 |
| 4,330,589 | 5/1982 | Saito et al. .................. 264/42 X |
| 4,353,748 | 10/1982 | Birchall ....................... 106/89 |
| 4,379,729 | 4/1983 | Cross .......................... 156/73.6 |
| 4,477,300 | 10/1984 | Pilgrim ....................... 264/70 X |
| 4,613,627 | 9/1986 | Sherman et al. ........... 264/26 X |
| 4,673,543 | 6/1987 | Akasaka et al. ............ 264/82 |
| 4,693,924 | 9/1987 | Kuper et al. ............. 264/DIG. 6 |
| 4,965,031 | 10/1990 | Conroy ....................... 264/122 |

FOREIGN PATENT DOCUMENTS

| | | |
|---|---|---|
| 1033123 | 6/1958 | Fed. Rep. of Germany. |
| 2717276 | 10/1977 | Fed. Rep. of Germany. |
| 2728581 | 1/1978 | Fed. Rep. of Germany. |
| 139614 | 1/1980 | Fed. Rep. of Germany. |
| 1437040 | 5/1976 | United Kingdom. |
| 1483046 | 8/1977 | United Kingdom. |
| 2004807 | 4/1979 | United Kingdom ............. 264/70 |

Primary Examiner—Karen Aftergut
Attorney, Agent, or Firm—Vickers Daniels & Young

[57] ABSTRACT

Glass fibre reinforced plasterboard including a gypsum matrix of high density with embedded staple glass fibres therewith forming a pressure resistant solid body frame in which are embedded a plurality of very small hollow spaces of 5-350 microns in diameter, produced by a fine-pore foam or at least partially by small particles of non-porous and non-water absorbing fillers. During the manufacturing process of such glass fibre reinforced gypsum board, the gypsum and the fibre pieces are given only so much water that the water/gypsum ratio does not exceed 0.6, whereafter a foam and/or pourable or free-flowing fillers are added in such quantities that the apparent density of the entire board is at least 20% smaller than the density of the bonding means component of the matrix, and the paste is subjected while being formed to a vibration.

16 Claims, No Drawings

METHOD FOR PRODUCING GLASS FIBER REINFORCED PLASTERBOARD

This is a division, of application Ser. No. 681,108 filed Apr. 5, 1991 now U.S. Pat. No. 5,173,364.

FIELD OF THE INVENTION

The invention relates to a glass fibre reinforced plasterboard and a method for producing same.

DESCRIPTION OF THE PRIOR ART

Plasterboards or gypsum boards, which are manufactured at large formats with a thickness of 5 to 20 mm, are mainly used for interior construction. In order to increase their flexural strength, it is known to provide the outer layers of the board with a sheath, for example of cardboard, which externally covers a gypsum core and which is firmly connected to the gypsum (plastercardboard). Another method of reinforcement is applied for gypsum boards with an intended high degree of fire resistance. The gypsum boards then comprise several layers, the outer ones containing fibreglass fleece (U.S. Pat. No. 3,993,822), whilst the gypsum core is composed of a mixture of gypsum and water, if required with short glass fibres or mineral fibres added (DE-AS 1 033 123).

Also known are light-fibre gypsum boards (DE-OS 2 728 581) with a light core board manufactured of gypsum, chopped glass fibres and foam generating materials, the core board being surrounded on all sides by fibre mats which are laid into a form into which the gypsum slurry is poured. These fibre mats can be woven or manufactured materials, but also fleece material of synthetic fibres, which give the board the desired stability whilst their gypsum core, which in itself is of low breaking resistance, offers the required form stability. The materials used and the construction of the board demand complicated, cost-intensive manufacturing, resulting in a high price of such coated boards which limits their possible applications.

There are also other glass fibre reinforced gypsum boards whereby the glass fibres are arranged to be concentrated immediately underneath the top surface of the board (U.S. Pat. No. 4,195,110). This known type of board is very elaborate in its manufacturing process as it has to be cast of separate gypsum layers of different density.

In another type of gypsum board with a multi-layer structure (DE-OS 27 17 276), the matrix of crystalline gypsum also contains glass fibres and asbestos fibres and is formed so that a core layer of lower density transides continuously into respective exterior layers of higher density. A multi-layer product of this type is very difficult to manufacture. It is particularly difficult to regulate the density of the individual layers so that the denser layers are at the exterior sides and the layers of lesser density in the middle. Furthermore, this production necessitates working with a water surplus which has to be drawn off after casting the board. After casting, it is further necessary to subject the board to a pressurising process in order to achieve a firm inner bond between the individual gypsum layers.

All layered, surface-sheathed and glass fibre reinforced gypsum boards have in common that their layers are inclined to separate from one another either during the manufacturing process or later whilst in use as the adhesive- and shearing strength in the bordering surfaces between the individual layers is generally less than inside each layer.

In order to avoid the disadvantages of sandwich-like constructed boards, glass fibre reinforced gypsum boards are known which have 2%-vol. glass fibres of short lengths mixed into the gypsum compound as a reinforcement (DD Patent 139 614). During the manufacture, the gypsum is sprinkled into a mixture of water, foam material and fibre material which has been foamed up prior to adding the bonding substances. The foaming up is to assure that the finished product has a cell structure and is, in consequence, of lesser weight and easier to work with, i.e. it permits either sawing, nailing or clamping. However, sprinkling gypsum into the foamed-up substance does not achieve thorough mixing of gypsum and glass fibres, in particular as the short cut glass fibres, henceforth called "chopped fibres", are inclined to adhere to each other due to adhesive properties, so that the individual glass fibres do not embed themselves in the gypsum matrix and are not surrounded by same at all sides. In particular if anhydrite is used according to this known proposal, then the finished product is inhomogenous and has highly differing stability.

In the manufacture of a similarly based fibre reinforced gypsum board (GB-PS 1 437 040), a prepared foam is added to a stiff mixture of gypsumhalfhydrate and water. In a subsequent production stage, glass fibre pieces of short length are mixed into this reliquefied gypsum mixture. In spite of the following mixing process in the mixer, the short fibreglass pieces are not sufficiently bonded in the gypsum matrix, so that they cannot serve as desired as reinforcing agents, and the finished board has a relatively low density, but also only limited break resistance which does not go beyond 2.2 $MN/m^2$.

With regard to a continuous production of glass fibre reinforced gypsum boards, it has already been suggested to feed a mixture of glass fibres and an aqueous gypsum compound from a funnel into a mould or onto a surface which moves along under the funnel opening (GB-PS 1 483 046). Internal vibrators, which are flowed around by the mass and vibrate it in a certain direction and at the same time align the glass fibres in the mass, are arranged in the funnel outlet opening to permit the glass fibre reinforced gypsum compound to run out of the funnel and spread out on a forming table. This vibration also removes air- and gas bubbles trapped in the mass, and a gypsum board is produced which is of relatively high rigidity but also very heavy and difficult to work with due to its high density. If the glass fibres are aligned in one direction during the manufacturing process, then the flexural strength of the boards differs in different directions.

SUMMARY OF THE INVENTION

It is an object of the invention to provide a glass fibre reinforced gypsum board which is more homogenous and of virtually equal rigidity in all directions, but only of low overall weight and easily processed. Furthermore, it is an object of the invention to provide a process for continuous manufacture of glass fibre reinforced gypsum boards even on conventional gypsum board producing equipment.

These objects are achieved by features specified in the claims.

A glass fibre reinforced gypsum board of the desired properties is characterised according to the invention by the following features:

a) a gypsum matrix ($CaSO_4 2H_2O$), made from a hemihydrate and water, the density of which is at least 1.35 g/cm$^3$ and at least 25% higher than the density of the finished board;

b) glass fibres as reinforcement, having a diameter of 5–20 μm and a length of 2–20 mm and in a quantity of 0.3–3.0 weight-% of the finished board, evenly distributed therein;

c) a plurality of voids, evenly distributed in the skeleton of solid material, which is composed of the gypsum matrix and the glass fibres, and each individual void having a diameter of 5–350 μm and altogether taking up a volume of at least 20% of the overall finished board.

DESCRIPTION OF THE PREFERRED EMBODIMENTS

When manufacturing a gypsum matrix of hemihydrate and water and with a density of at least 1.35 g/cm$^3$, then this is based on a water/gypsum ratio of between 0.4 and 0.60. Preferably, the water/gypsum ratio is 0.4–0.55. In the following, "water/gypsum ratio" is understood to mean the weight ratio of the total liquid, i.e. water, foam water and, if appropriate, liquefier, to the entire solid material quantity which, apart from hemihydrate, includes glass fibers and, if appropriate, free-flowing or pourable fillers. Such a low water/gypsum ratio produces a gypsum matrix of high density and final strength, because after the setting and drying of the gypsum in the matrix only those pores remain which originate from evaporation of the surplus water in the matrix.

A gypsum compound of a water/gypsum ratio between 0.4 and 0.60 can still flow freely under its own weight, however, if according to the invention glass fibers as chopped fibers with a diameter of 5 to 20 μm and a length of 2 to 20 mm are added at a quantity of 0.3 to 3.0 weight-% of the finished board, then the paste becomes so thick that it will no longer flow under its own weight. It can then be processed only with difficulties by a rotary mixer as used in conventional gypsum-board production plants, because the increase in viscosity causes shearing forces in the mixer which are so high that the installed output of the mixer has to be increased considerably, and jamming of the mixer must be expected.

However, by mixing in a separately made thick foam of a suitable tenside and/or by adding non-porous and non-water absorbing solid and hollow filler materials with particles no larger than 350 μm, it is surprisingly achieved that the viscosity of the initially very stiff mixture, which disperses glass fibers well, is again reduced to such an extent that this mixture can be processed easily in conventional rotary mixers. When using a micro foam, the cell structure of the foam is hardly changed in this process and voids of 5–350 μm in diameter develop in the mixture. Thus, the gas bubbles of the foam are not joined by the shearing action into large, macroscopic air bubbles which would result in an inhomogenous product of small mechanical strength, instead the microscopic gas bubbles, like the ball-shaped solid body particles of the paste, render the product thereof a homogenous structure with evenly distributed microscopic voids.

In embodying the invention, the foam may have an apparent density of maximum 0.12 g/cm$^3$. Preferably, the foam forming material is a tenside or a polyvinylalcohol. The paste will then flow easily from the rotary mixer without forming lumps. It has a much improved cohesion relative to a gypsum compound of higher water/gypsum ratio. On a moving surface under the mixer outlet, for example a moving conveyor belt on which the produced boards harden and are cut and dried, the mass is then subjected, according to the invention, to a vibration, for example by a shaker, so that it spreads out flat and larger air pockets are expelled. Even when adding a thicker foam into the mixer, the micro gas bubbles in the foam are surprisingly not destroyed by this vibration, but form micro cells which, after the gypsum has set, are spread out in the end product which is then of an overall porous structure, but comprising a dense matrix. This gypsum matrix, which firmly encloses and bonds the individual chopped glass fibers, forms an extremely pressure resistant and flexurally resistant skeleton of solid particles which is interpersed by evenly spaced gas bubbles, established by the foam or the hollow solid body particles.

If non-porous or non-water absorbing free-flowing or pourable fillers are to be added totally or partially in lieu of a foam, then they should be spherical with an apparent density of no more than 0.7 q/cm$^3$. The size of the individual particles should be <350 μm, whereby light fillers of up to 20 weight-% of the finished board can be added. The fillers can be, for example, hollow glass balls or spherical solid bodies (cenospheres) of fly ash. Balls of synthetic materials can also be used.

After forming, bonding and drying, the end product is of a homogenous composition and is characterised by a bonding-matrix of high density and by low apparent density and high strength. The apparent density lies between 0.6 g/cm$^3$ and 1.08 g/cm$^3$, whilst the gypsum matrix has a density of at least 1.35 g/cm$^3$, thus being at least 25% larger than the apparent density of the overall mixture.

The basic material gypsum, i.e. calciumsulphatebetahemihydrate, should be pure as in pure natural gypsum, chemical gypsum or FGD gypsum. Best results are obtained by means of hemihydrate of gypsum which occur in flue gas desulphurisation plants (FGD gypsum). The applied quantity can be between 80 and 99.5 weight-% of the total quantity of solids.

Preferred for use as glass fibers are chopped fibers which in water divide into individual fibers, with a length of between 2 and 20 mm, preferably with a length of 7 mm, and in a quantity of 0.3 to 3.0 weight-%, preferably in a quantity of 1.0 to 2.0 weight-% of the total weight of the board.

Depending on the type of product to be manufactured, it is also possible to add a plurality of additives, for example polystyrene balls, mica, clay, fly ash, vermiculites, other known silicates and aluminium-silicates. Furthermore, processing aids, such as known types of accelerators, retardants and liquefiers, can also be applied.

In a process of manufacturing boards embodying the invention, the gypsum, the fibers and, if appropriate, the solid fillers are mixed, and the resulting mixture is filled into a rotary mixer. At the same time, the required quantity of water and separately produced foam are separately added and mixed with the solids. The paste, which has been thoroughly processed by the mixer, is then poured into a form, which is transported under the mixer outlet, or onto a conveyor surface which are for a limited length subjected to a vibration during which the paste spreads and is shaped. The mass dries and is cut into the desired boards and dried.

Ratio of water to solids: 0.49

A comparison of the board compositions in examples C and D with other board compositions is shown in the following chart:

| | Board Composition (in weight-%) | | | | | | Properties | |
|---|---|---|---|---|---|---|---|---|
| | | Glass Fibres | | | Solid | | Water/ Gypsum## | Apparent Density | Break Resistance |
| Example | Gypsum | 7 mm | 13 mm | Foam | Fillers# | Liquefier | Ratio | g/cm$^3$ | N/mm$^2$ |
| A | 98.5 | — | 1.5 | — | — | 0.2 | 0.45 | 1.30 | 11.6 |
| B | 98.5 | 1.5 | — | — | — | 0.2 | 0.49 | 1.26 | 12.7 |
| C | 98.5 | 1.5 | — | + | — | 0.2 | 0.47 | 1.01 | 10.5 |
| D | 78.1 | — | 1.9 | — | 20 | 0.2 | 0.49 | 1.01 | 8.8 |
| E | 98.5 | 1.5 | — | — | — | 0.2 | 0.75 | 1.02 | 5.0 |
| F | 98.5 | 1.5 | — | — | — | 0.2 | 0.85 | 0.95 | 3.2 |

(Cenospheres)
Ratio of water and foam to halfhydrate and, if appropriate, fillers After setting and drying, a mechanically isotropic glass fiber reinforced gypsum board is obtained in which the solid components, substantially composed of glass fibers and re-hydrated gypsum, have a density which is substantially higher than the apparent density of the overall product.

The gas bubbles, placed inside the finished board by way of the foam, have an average diameter of approximately 50 μm. Overall, they take up a volume of at least 20% of the entire finished board.

In order to obtain a good, even and non-aligned distribution of the glass fibers in the gypsum matrix, they are initially dry-mixed with the gypsum and, if appropriate, with the solid fillers, and filled together with them into the rotary mixer. It is also possible to enter all solids in an unmixed state into the mixer and to loosen them up by vorticity.

Below, two examples for the invention are given:

EXAMPLE C

A mixer of the ERSHAM type is loaded with 791 kg/h hemihydrate, 14 kg/h chopped glass fibers of 7 mm length of HTH 8144 Rovings, 325 l/h water with the addition of 0.2% of the water-reducing substance TAMOL NH and a foam which has been brought up to an apparent density of 0.1 g/cm$^3$ by foaming 50 l/h of a 1% solution of the foam substance GYP2 with air. The paste flowing out of the mixer is then spread by way of vibration to a board of 12.6 mm thickness. The paste density was 1.34 g/cm$^3$, the density of the thus formed dried board was 1.01 g/cm$^3$. The break resistance of the board was 10.5N/mm$^2$.

Composition of the board: 98.5 weight-% dihydrate, 1.5 weight-% glass fibers.

Ratio of water to solids: 0.47

EXAMPLE D

A mixer of the ERSHAM type is loaded with 1059 kg/h hemihydrate, 31 kg/h chopped glass fibers of 13 mm length of HTH 8144 Rovings, 320 kg/h of hollow glass-bead fraction (cenospheres) obtained from fly ash and 690 l/h water with an addition of 0.2% of the water-reducing substance TAMOL NH. The paste flowing out of the mixer is then spread by way of vibration to a board of 13.8 mm thickness. The density of the paste was 1.37 g/cm$^3$, the density of the thus formed dried board was 1.01 g/cm$^3$. The break resistance of the board was 8.8N/mm$^2$ Composition of the board: 78.1 weight-% dihydrate, 1.9 weight-% glass fibers, 20% cenospheres.

comparing the examples A through F, one notices that the preferred compositions C (using foam) and D (using lightweight hollow spheres-cenospheres) give break resistances that are more than twice the values of examples E and F (without foam or lightweight hollow spheres) respectively. This is so even though all of Examples C, D, E and F include substantially the same glass fiber content and the apparent densities of the products are substantially the same. Quite surprisingly, the break resistances of C and D are much closer to those obtained in Examples A and B although the apparent densities of the latter are much higher, the glass fiber content is the same as in C and D, the water/gypsum ratios are similar and no foam or lightweight fillers are used in A and B. This comparison shows that only the compositions according to the invention give an optimum result i.e. products that are both strong and lightweight.

With the water/gypsum ratio higher than specified herein, equally small or smaller apparent densities can be produced, but the break resistance is reduced by more than half. The desired optimum is thus achievable only as has been described.

I claim:

1. A method for producing glass fibre reinforced gypsum boards adapted for use as a wallboard having a uniform isotropic high break resistance comprising a single uniform layer of body material having a generally uniform density, said method including the steps of:
   a) forming a water-gypsum paste by adding water to a solid mixture to obtain a water to solid mixture ratio of 0.4 to 0.6, said solid mixture comprising gypsum, glass fibre and a non-water absorbing filler material, said filler material having a particle size of no larger than 350 microns, an apparent density of no more than 0.7 g/cm$^3$ and being added in an amount so as not to exceed 20 weight percent of said gypsum board;
   b) dispersing said solid mixture in said water of said paste in an essentially uniform manner to reduce viscosity and density of said paste;
   c) pouring said paste into a form and subjecting said paste to vibrations to spread and shape said paste in said form; and
   d) cutting said paste into said gypsum board and subsequently drying said gypsum board.

2. A method as in claim 1, wherein said glass fibre has a diameter of 5-20 microns and a length of 2-20 mm.

3. A method as in claim 1, wherein said glass fibre constitutes 0.3-3.0 weight percent of said gypsum board.

4. A method as in claim 2, wherein said glass fibre constitutes 0.3-3.0 weight percent of said gypsum board.

5. A method as in claim 1, wherein said form is a continuously moving surface.

6. A method as in claim 4, wherein said form is a continuously moving surface.

7. A method for producing glass fibre reinforced gypsum boards adapted for use as a wallboard having a uniform isotropic high break resistance comprising a single uniform layer of body material having a generally uniform density, said method including the steps of:
  a) forming a water-gypsum paste by adding water to a solid mixture, said solid mixture comprising gypsum and glass fibre, said glass fibre being added in an amount so as to constitute 0.3-3.0 weight percent of said gypsum board;
  b) adding a microfoam which forms voids in said paste having a diameter of 5-350 microns to said paste and evenly dispersing said foam and said solid mixture in said water-gypsum paste to reduce viscosity and density of said paste, said foam having an apparent density which does not exceed 0.12 g/cm$^3$, said paste of water, gypsum, glass fibre and foam having a water to solid ratio of 0.4-0.60;
  c) pouring said paste into a form and subjecting said paste to vibrations to spread and shape said paste in said form; and
  d) cutting said paste into said gypsum board and subsequently drying said gypsum board.

8. A method as in claim 7, wherein said glass fibre has a diameter of 5-20 microns and a length of 2-20 mm.

9. A method as in claim 7, wherein said voids formed by said foam constitute at least 20% of a volume of said gypsum board.

10. A method as in claim 8, wherein said voids formed by said foam constitute at least 20% of a volume of said gypsum board.

11. A method as in claim 7, wherein said microfoam is selected from the group consisting of tenside and polyvinylalcohol.

12. A method as in claim 10, wherein said microfoam is selected from the group consisting of tenside and polyvinylalcohol.

13. A method as in claim 7, including the step of adding a non-water absorbing filler material with said microfoam, said filler material having a particle size of up to 350 microns and an apparent density of no more than 0.7 g/cm$^3$.

14. A method as in claim 12, including the step of adding a non-water absorbing filler material with said microfoam, said filler material having a particle size of up to 350 microns and an apparent density of no more than 0.7 g/cm$^3$.

15. A method as in claim 7, wherein said form is a continuously moving surface.

16. A method as in claim 14, wherein said form is a continuously moving surface.

* * * * *